(12) United States Patent
Takeda et al.

(10) Patent No.: US 10,324,239 B2
(45) Date of Patent: Jun. 18, 2019

(54) DISPLAY DEVICE AND COLOR FILTER SUBSTRATE

(71) Applicant: Japan Display Inc., Minato-ku (JP)

(72) Inventors: Arihiro Takeda, Tokyo (JP); Jin Hirosawa, Tokyo (JP); Yoshitaka Yamada, Tokyo (JP)

(73) Assignee: Japan Display Inc., Minato-ku (JP)

( * ) Notice: Subject to any disclaimer, the term of this patent is extended or adjusted under 35 U.S.C. 154(b) by 9 days.

(21) Appl. No.: 15/186,713

(22) Filed: Jun. 20, 2016

(65) Prior Publication Data

US 2017/0038637 A1 Feb. 9, 2017

(30) Foreign Application Priority Data

Aug. 3, 2015 (JP) ................................. 2015-153136

(51) Int. Cl.
*G02B 5/20* (2006.01)
*G02F 1/1335* (2006.01)
*G02F 1/1333* (2006.01)
*G02F 1/1343* (2006.01)

(52) U.S. Cl.
CPC ....... *G02B 5/201* (2013.01); *G02F 1/133512* (2013.01); *G02F 1/133345* (2013.01); *G02F 2001/134372* (2013.01); *G02F 2201/40* (2013.01)

(58) Field of Classification Search
CPC ......... G02F 1/133514; G02F 1/133345; G02F 1/133512; G02F 1/133528; G02F 1/1337; G02F 1/133784; G02F 1/1339; G02F 1/134309; G02F 1/13439; G02F 1/136286; G02F 1/1368; G02F 2001/133519;
(Continued)

(56) References Cited

U.S. PATENT DOCUMENTS

2002/0001054 A1  1/2002  Byun et al.
2007/0070268 A1* 3/2007  Choi ...................... G02F 1/1303
                                                          349/106
(Continued)

FOREIGN PATENT DOCUMENTS

CN         103926758 A      7/2014
CN         104483776 A      4/2015
(Continued)

OTHER PUBLICATIONS

Office Action dated Dec. 5, 2018, in Chinese Patent Application No. 201610548467.9 w/Partial English Translation).

*Primary Examiner* — Wen Huang
(74) *Attorney, Agent, or Firm* — Oblon, McClelland, Maier & Neustadt, L.L.P.

(57) ABSTRACT

According to one embodiment, a display device includes a first substrate and a second substrate which are opposed to each other, wherein the second substrate includes, in a display area where an image is displayed, first light shields extending in a first direction and arranged apart from each other in a second direction which crosses the first direction, second light shields extending in the second direction and arranged apart from each other in the first direction, and an intermediate layer disposed between the first light shields and the second light shields, and the first light shields cross the second light shields via the intermediate layer.

11 Claims, 15 Drawing Sheets

(58) Field of Classification Search
CPC ... G02F 2001/134372; G02F 2201/121; G02F 2201/123; G02B 5/201
USPC .......................................................... 359/891
See application file for complete search history.

(56) References Cited

U.S. PATENT DOCUMENTS

| | | | |
|---|---|---|---|
| 2012/0327338 A1* | 12/2012 | Kobayashi | G02F 1/133512 349/106 |
| 2014/0198278 A1* | 7/2014 | Kesho | G02F 1/134336 349/46 |
| 2016/0356930 A1 | 12/2016 | Li et al. | |

FOREIGN PATENT DOCUMENTS

| | | |
|---|---|---|
| JP | 2002-55334 | 2/2002 |
| JP | 2009-223266 | 10/2009 |

* cited by examiner

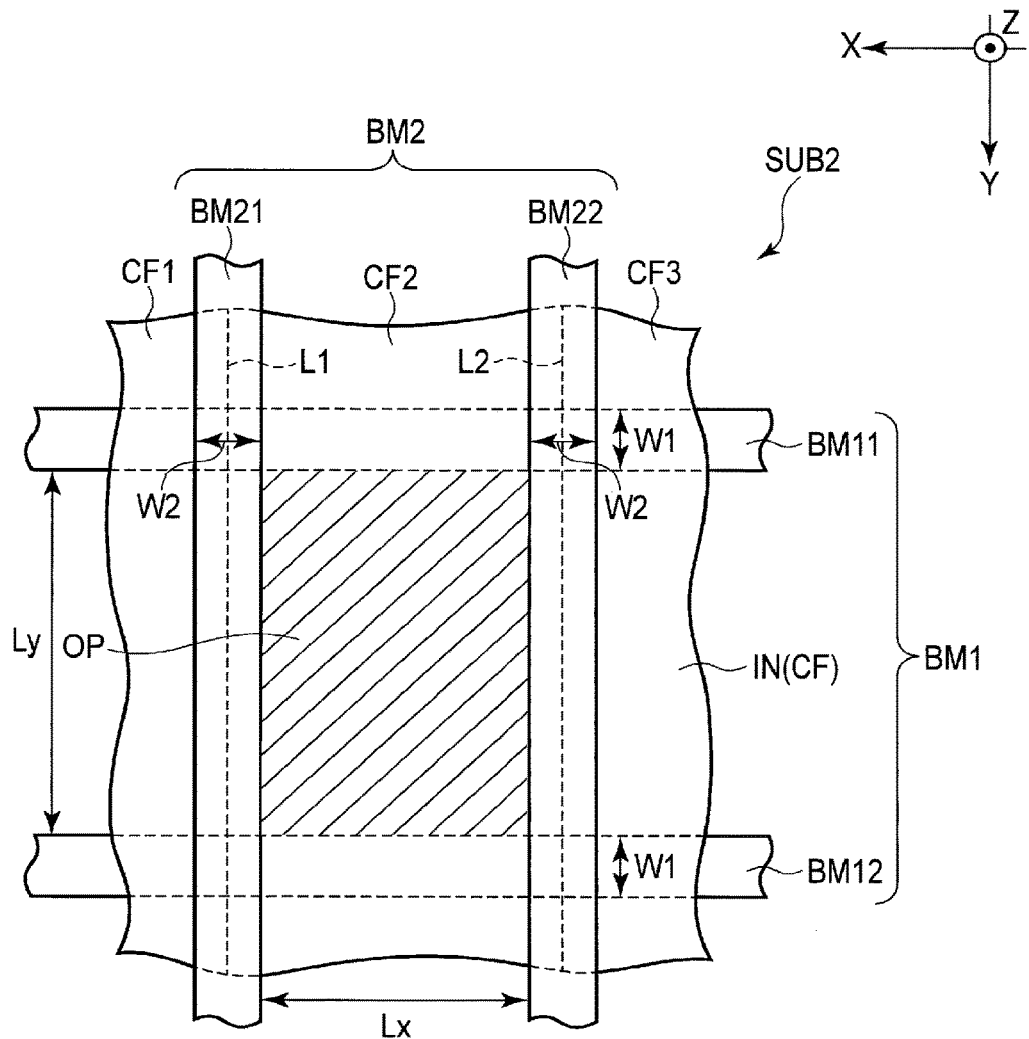
F I G. 2

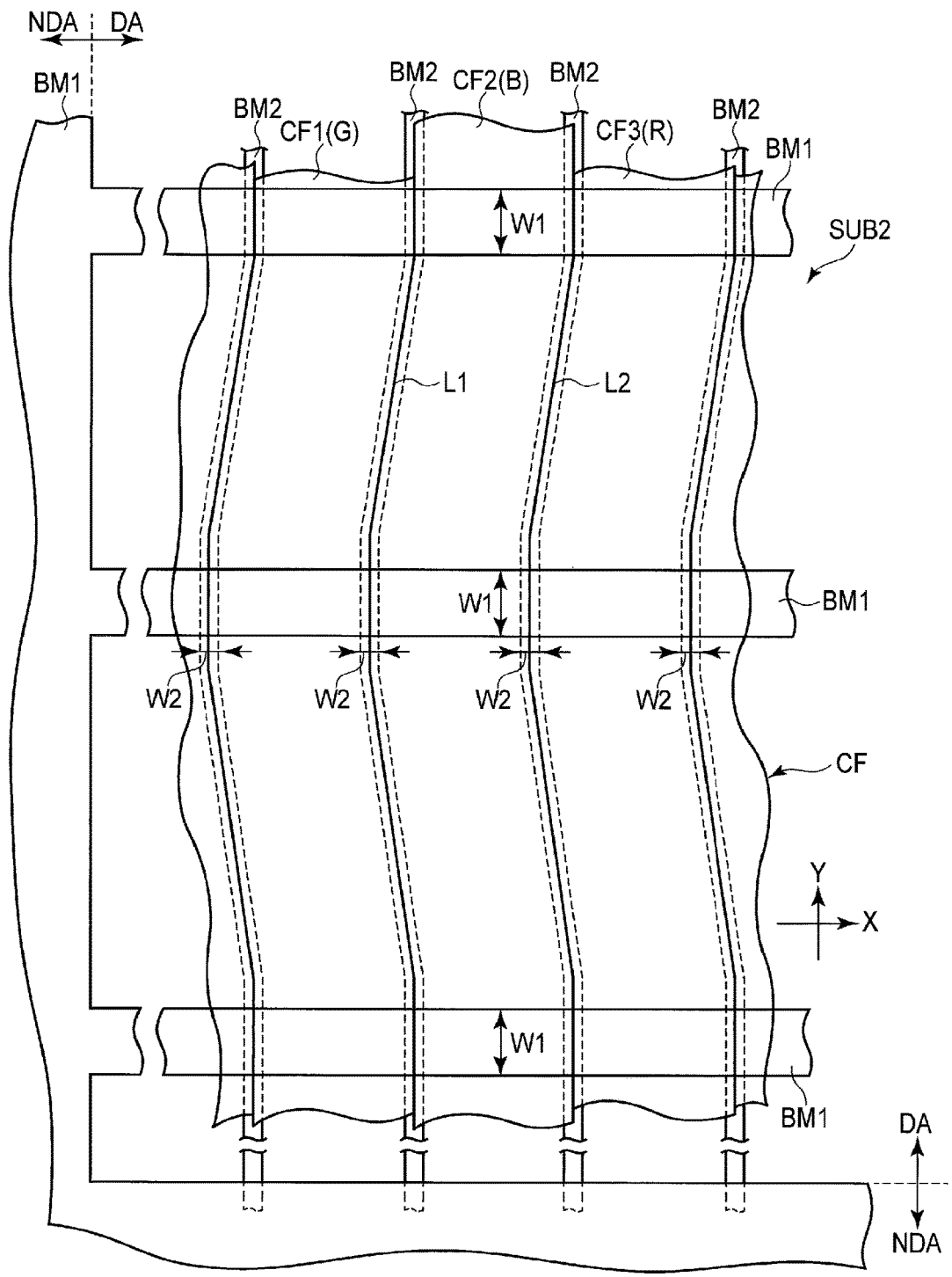
F I G. 8

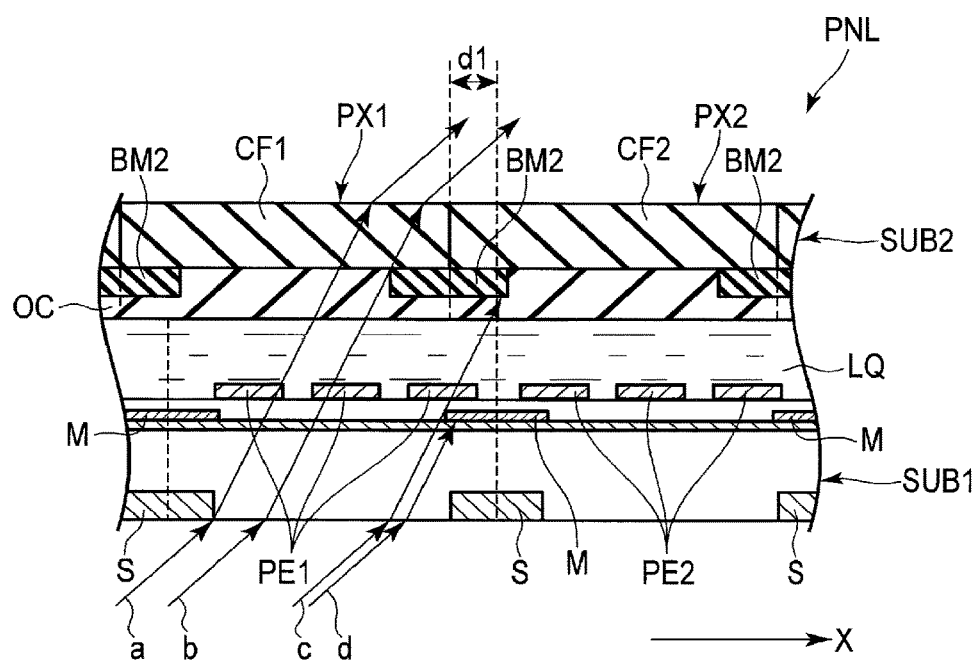
F I G. 11

DISPLAY DEVICE AND COLOR FILTER SUBSTRATE

CROSS-REFERENCE TO RELATED APPLICATIONS

This application is based upon and claims the benefit of priority from Japanese Patent Application No. 2015-153136, filed Aug. 3, 2015, the entire contents of which are incorporated herein by reference.

FIELD

Embodiments described herein relate generally to a display device and a color filter substrate.

BACKGROUND

Liquid crystal display devices are used in various fields and include, for example, a light shielding layer formed as a lattice. In recent years, such liquid crystal display devices have been increasingly required to achieve higher definition, and an arrangement of a light shielding layer which allows a high aperture ratio is a key to meeting this requirement.

For example, there is a well-known technique of forming a liquid crystal display device which includes a first substrate with a light shielding layer formed as stripes and a second substrate with a light shielding layer formed as stripes which are perpendicular to the direction of extension of the light shielding layer of the first substrate.

There is another well-known technique of forming a lattice-like light shielding layer including a mask with striped exposing parts extending in a first direction and a mask with striped exposing parts extending in a second direction.

BRIEF DESCRIPTION OF THE DRAWINGS

FIG. 2 is a plan view showing a part of the structure of a second substrate SUB2 of the embodiment.

FIG. 5 is a perspective view schematically showing a layered relationship of a light shield BMA, light shield BMB, and intermediate layer IN.

FIG. 6 is another perspective view schematically showing a layered relationship of light shield BMA, light shield BMB, and intermediate layer IN.

FIG. 7 is another perspective view schematically showing a layered relationship of light shield BMA, light shield BMB, and intermediate layer IN.

FIG. 8 is a plan view which shows the second substrate SUB2 of the embodiment and shows an example of a layout of a color filter layer of an intermediate layer CF, first light shield BM1, and second light shield BM2.

FIG. 11 is a cross-sectional view schematically showing the display panel PNL of FIG. 10 in which a misalignment occurs between the first substrate SUB1 and the second substrate SUB2.

DETAILED DESCRIPTION

Figure 1:
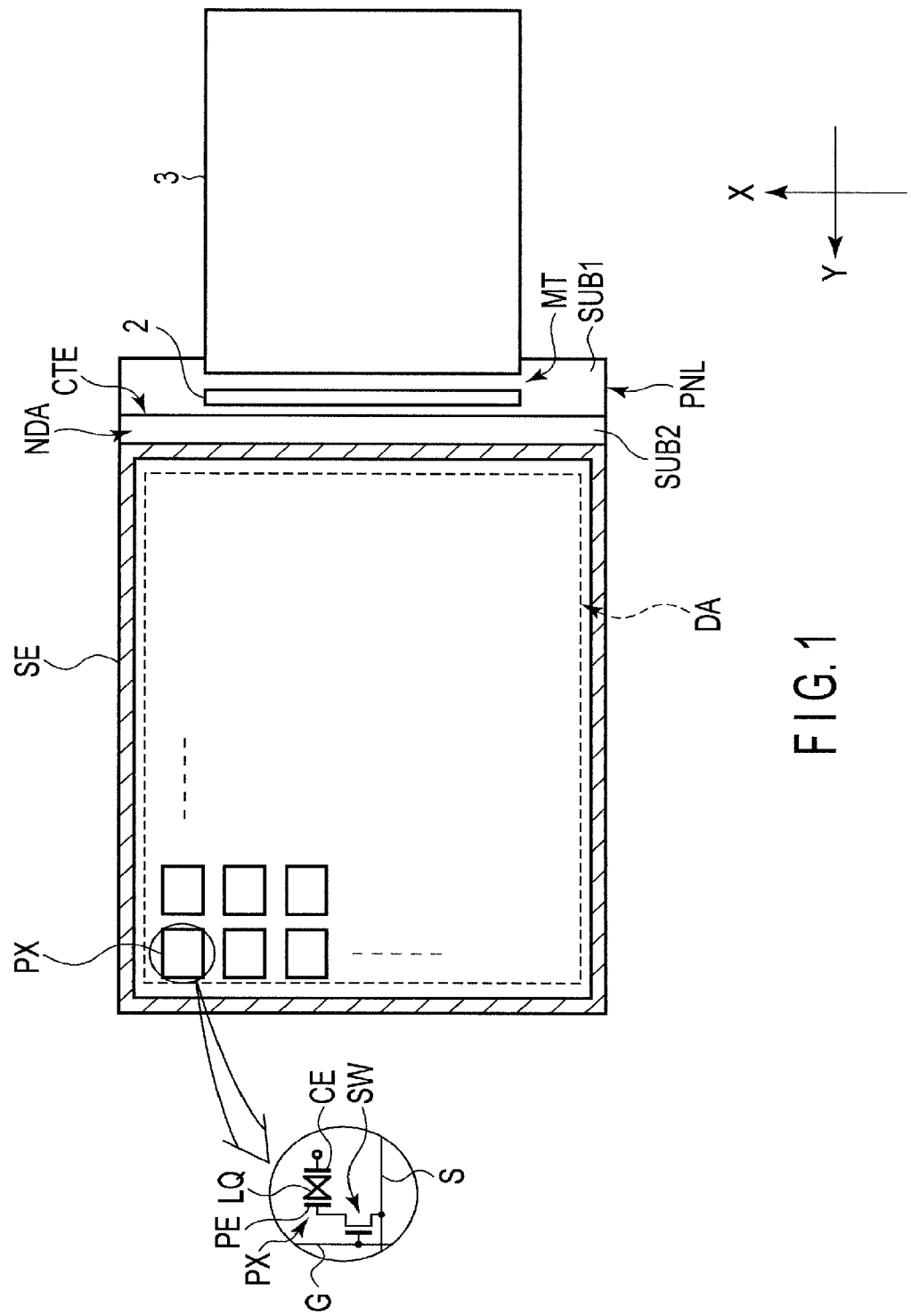
FIG. 1 is a schematic view of the structure of a display panel PNL of a liquid crystal display device of an embodiment.

In general, according to one embodiment, a display device includes a first substrate and a second substrate which are opposed to each other, wherein the second substrate includes, in a display area where an image is displayed, first light shields extending in a first direction and arranged apart from each other in a second direction which crosses the first direction, second light shields extending in the second direction and arranged apart from each other in the first direction, and an intermediate layer disposed between the first light shields and the second light shields, and the first light shields cross the second light shields via the intermediate layer.

According to one embodiment, a color filter substrate of a display device includes an insulating substrate, and first light shields, second light shields, and an intermediate layer formed on the insulating substrate, wherein the first light shields extend in a first direction and are arranged apart from each other in a second direction which crosses the first direction, the second light shields extend in the second direction and are arranged apart from each other in the first direction, and the intermediate layer is disposed between the first light shields and the second light shields, and the first light shields cross the second light shields via the intermediate layer.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a schematic view of the structure of a display panel PNL of a liquid crystal display device of an embodiment. FIG. 1 is a plan view of the display panel PNL in an X-Y plane which is defined by a first direction X and a second direction Y crossing each other. Here, the first direction X and the second direction Y are orthogonal to each other; however, they may cross at an angle other than 90°.

That is, the display panel PNL is a liquid crystal display panel of active matrix type and includes a first substrate SUB1, second substrate SUB2 which is opposed to the first substrate SUB1, and liquid crystal layer LQ which is interposed between the first substrate SUB1 and the second substrate SUB2. The first substrate SUB1 and the second substrate SUB2 are adhered together by a sealant SE with a certain cell gap formed therebetween. In the example depicted, the sealant SE is formed as a rectangular loop. The liquid crystal layer LQ is held inside an area surrounded by the sealant in the cell gap between the first substrate SUB1 and the second substrate SUB2. The display panel PNL includes a display area DA inside the area surrounded by the sealant SE for image display. The display area DA is, for example, a substantial rectangle and is composed of a plurality of pixels PX arranged in a matrix.

The first substrate SUB1 includes, in the display area DA, gate lines G extending in the first direction X, source lines S extending in the second direction Y, switching element SW electrically connected to the gate line G and the source line S in each pixel PX, and a pixel electrode PE connected to the switching element SW in each pixel PX, for example. Common electrodes CE of common potential are disposed in the first substrate SUB1 or in the second substrate SUB2 and opposed to a plurality of pixel electrodes PE. Note that the gate line G need not be formed as a linear shape parallel to the first direction X and the source line S need not be formed as a linear shape parallel to the second direction Y. That is, the gate lines G and the source lines S may be bent or may be partly branched.

Signal suppliers used for drive of the display panel PNL such as a drive IC chip 2 and a flexible printed circuit (FPC) 3 are positioned in a non-display area (peripheral area) NDA outside the display area DA. In the example depicted, the drive IC chip 2 and the FPC 3 are mounted in a mount MT of the first substrate SUB1 which extends to the outside of a substrate edge CTE of the second substrate SUB2. The non-display area NDA surrounds the display area DA, includes the area in which the sealant SE is disposed, and is formed in a rectangular frame shape.

Detailed description of the display panel PNL is omitted. Note that, in a display mode using a vertical field along the normal of the substrate main surface or of the X-Y plane or in a display mode using an inclined field with respect to the substrate main surface, the pixel electrode PE is disposed in the first substrate SUB1 while the common electrode CE is disposed on the second substrate SUB2. Furthermore, in a display mode using a lateral field along the substrate main surface, both the pixel electrode PE and the common electrode CE are disposed on the first substrate SUB1. Alternatively, the display panel PNL may be structured to correspond to a display mode in which the above vertical, lateral, and inclined fields are arbitrarily combined.

The display panel PNL is, for example, of transmissive type having a phototransmissive display function which displays an image by selectively pass the light from an illumination device (backlight unit) BL described later. Note that the display panel PNL may be of reflective type having a photoreflective display function which displays an image by selectively reflecting the light from the display surface side such as external light and auxiliary light thereon. Alternatively, the display panel PNL may be of transflective type which includes both the phototransmissive display function and the photoreflective display function. If the display panel PNL is of reflective type, the illumination device BL disposed to be opposed to the first substrate SUB1 will be omitted, and in that case, an illumination device (front light unit) may be disposed to be opposed to the second substrate SUB2 instead.

FIG. 2 is a plan view showing a part of the structure of the second substrate SUB2 of the embodiment. Here, a third direction Z is perpendicular to both the first direction X and the second direction Y.

In the example depicted, the second substrate SUB2 includes a first light shield BM1, second light shield BM2, and intermediate layer IN. The intermediate layer IN is positioned between the first light shield BM1 and the second light shield BM2. That is, the first light shield BM1, second light shield BM2, and intermediate layer IN are formed in different layers and are layered along the third direction Z.

Here, the intermediate layer IN is a color filter layer CF; however, as described later, it may be a different layer. The color filter layer CF includes a color filter CF1 (first color filter), color filter CF2 (second color filter), and color filter CF3. Color filters CF1 to CF3 are of different colors. Note that, in this embodiment, the second substrate SUB2 corresponds to a color filter substrate on which the color filter layer CF is disposed.

In the example depicted, color filters CF1 to CF3 extend in the second direction Y and are arranged in the first direction X. A boundary L1 between color filters CF1 and CF2, and a boundary L2 between color filters CF2 and CF3 each extend in the second direction Y. Note that, the shape of color filters CF1 to CF3 is not limited to a linear band-like shape, and it may be a meandering band-like shape or a dot-like shape corresponding to each pixel.

The first light shield BM1 includes a light shield BM11 and a light shield BM12 formed as stripes. Light shields BM11 and BM12 extend in the first direction X and are arranged side by side in the second direction Y apart from each other. The second light shield BM2 includes a light shield BM21 and a light shield BM22 formed as stripes. Light shields BM21 and BM22 extend in the second direction Y and are arranged side by side in the first direction X apart from each other. Light shields BM11 and BM12 cross light shields BM21 and BM22 via the intermediate layer IN. Each of light shields BM11 and BM12 crosses light shields BM21 and BM22 at particular points and has a substantially uniform width W1 in the second direction Y. Each of light shields BM21 and BM22 crosses light shields BM11 and BM12 at particular points and has a substantially uniform width W2 in the first direction X. In this example, light shield BM21 is opposed to boundary L1, and light shield BM22 is opposed to boundary L2.

An area surrounded by light shields BM11 and BM12 of the first light shield BM1 and light shields BM21 and BM22 of the second light shield BM2 corresponds to an opening OP and is hatched in the figure. In the example depicted, the opening OP is formed in a rectangular shape. A side of the opening OP along the first direction X has a length Lx which corresponds to a gap between light shields BM21 and BM22 arranged in the first direction X. A side of the opening OP along the second direction Y has a length Ly which corresponds to a gap between light shields BM11 and BM12 arranged in the second direction Y. The four corners of the opening OP are formed by the crossing points of light shields BM11, BM12, BM21, and BM22, and are not formed by a single light shield.

The first light shield BM1 and the second light shield BM2 are formed by, for example, preparing a black resin material and performing exposure, development, and calcination of the material through a mask of a desired pattern. The first light shield BM1 and the second light shield BM2 are, of course, prepared in separate manufacturing processes. The resin material used is of either positive resist which dissolves in a developer by light irradiation or negative resist which is crosslinked by light irradiation to be insoluble in a developer.

Note that, which of the first light shield BM1 and the second light shield BM2 is formed in the first substrate SUB1 side is optional. Furthermore, the thickness of the first light shield BM1 in the third direction Z and the thickness of the second light shield BM2 in the third direction Z may differ. In this embodiment, the one formed in the first substrate SUB1 side between the first light shield BM1 and the second light shield BM2 has a smaller thickness. Furthermore, the first light shield BM1 and the second light shield BM2 are formed of the same material or may be formed of different materials. Furthermore, the first light shield BM1, second light shield BM2, and intermediate layer IN may be disposed in the first substrate SUB1.

In this embodiment, the first light shield BM1 extends in the first direction X and includes light shields BM11 and BM12 arranged side by side in the second direction Y apart from each other, and the second light shield BM2 extends in the second direction Y and includes light shields BM21 and BM22 arranged side by side in the first direction X apart from each other. Furthermore, the intermediate layer IN is formed between the first light shield BM1 and the second light shield BM2. That is, the first light shield BM1 and the second light shield BM2 are formed in different layers and form a lattice shape in the X-Y plane as being viewed from the third direction Z. The first light shield BM1 and the second light shield BM2 are formed individually through an exposure process using a mask of stripe pattern. With such a mask of stripe pattern, the first light shield BM1 and the second light shield BM2 can be formed desirably being less affected by a light diffraction. The first light shield BM1 and the second light shield BM2 formed as above cross and form openings OP, and roundness of the corners of each opening OP can be reduced. Therefore, the opening OP of desired shape can be achieved. Especially, when this is adopted in a liquid crystal display device of high definition, a pitch of the first light shield BM1 in the second direction Y and a pitch of the second light shield BM2 in the first direction X are reduced, and the widths of the first light shield BM1 and the second light shield BM2 are reduced while the effect of the light diffraction during the exposure process in the manufacturing process of the first light shield BM1 and the second light shield BM2 is reduced. Therefore, the embodiment can present a high-definition liquid crystal display device which has openings OP of desired size with reduced roundness in their corners to prevent a decrease in aperture ratio.

Now, structural examples of the embodiment will be explained.

Figure 3:
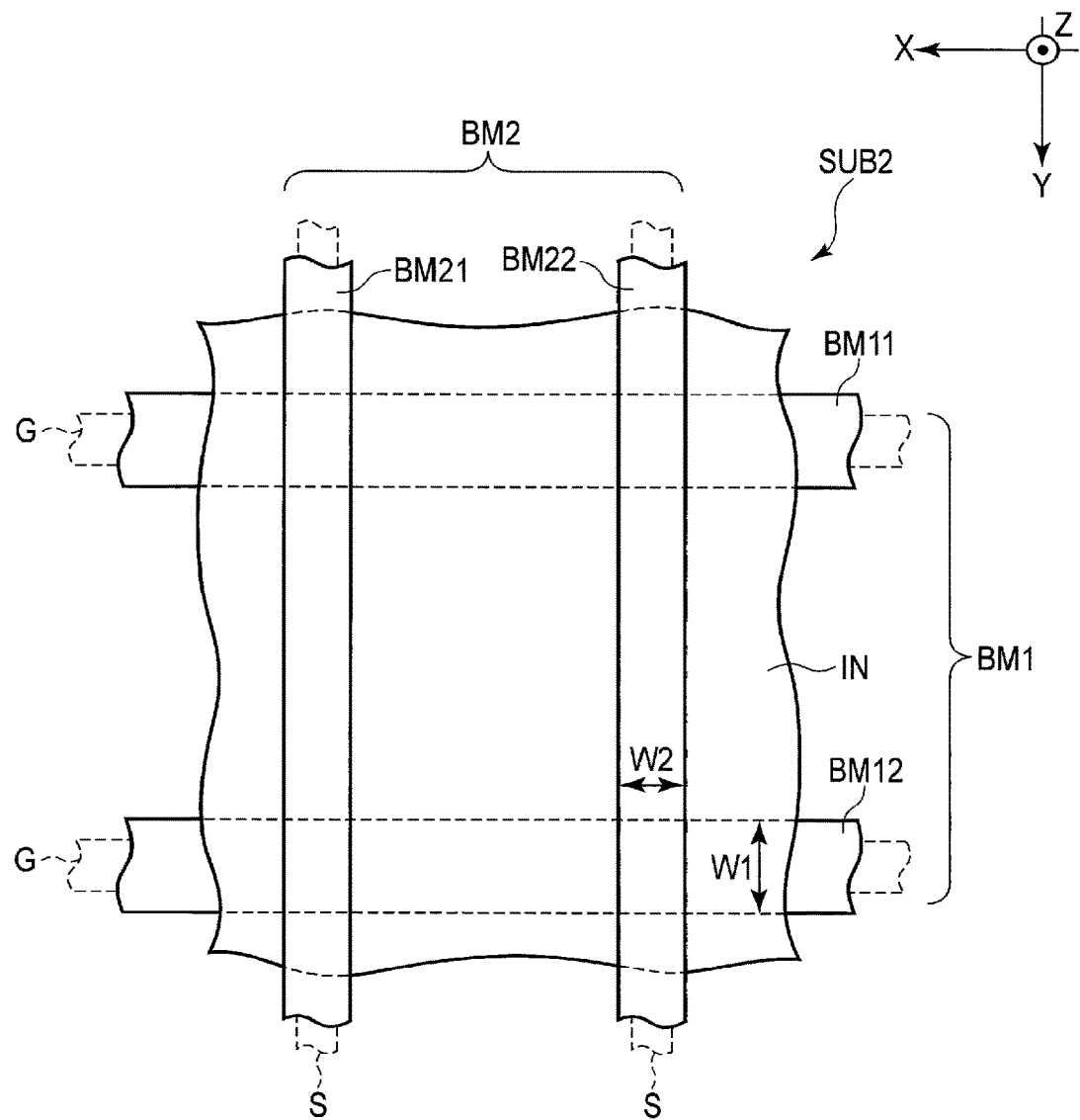
FIG. 3 is a plan view showing a part of the structure of the second substrate SUB2 and a positional relationship between gate lines G and source lines S formed on a first substrate SUB1.

FIG. 3 is a plan view showing a part of the structure of the second substrate SUB2 and a positional relationship between gate lines G and source lines S formed on the first substrate SUB1. In the figure depicted, the gate lines G and source lines S are shown as dotted lines.

Each of light shields BM11 and BM12 is opposed to a gate line G. Each of light shields BM21 and BM22 is opposed to a source line S. Light shields BM11 and BM12 of the first light shield BM1 each have a first width W1 in the second direction Y. Light shields BM21 and BM22 of the second light shield BM2 each have a second width W2 in the first direction X. In the example depicted, the first width W1 is greater than the second width W2.

The first width W1 is, for example, greater than or equal to the width of the gate line G, and the first light shield BM1 preferably overlaps the entirety of the gate lines G (and the entirety of the switching element in some cases) in the X-Y plane. Furthermore, the second width W2 is, for example, greater than or equal to the width of the source line S, and the second light shield BM2 preferably overlaps the entirety of the source lines S in the X-Y plane. Therefore, reflection of external light by the gate lines G and the source lines S can be suppressed.

Figure 4:
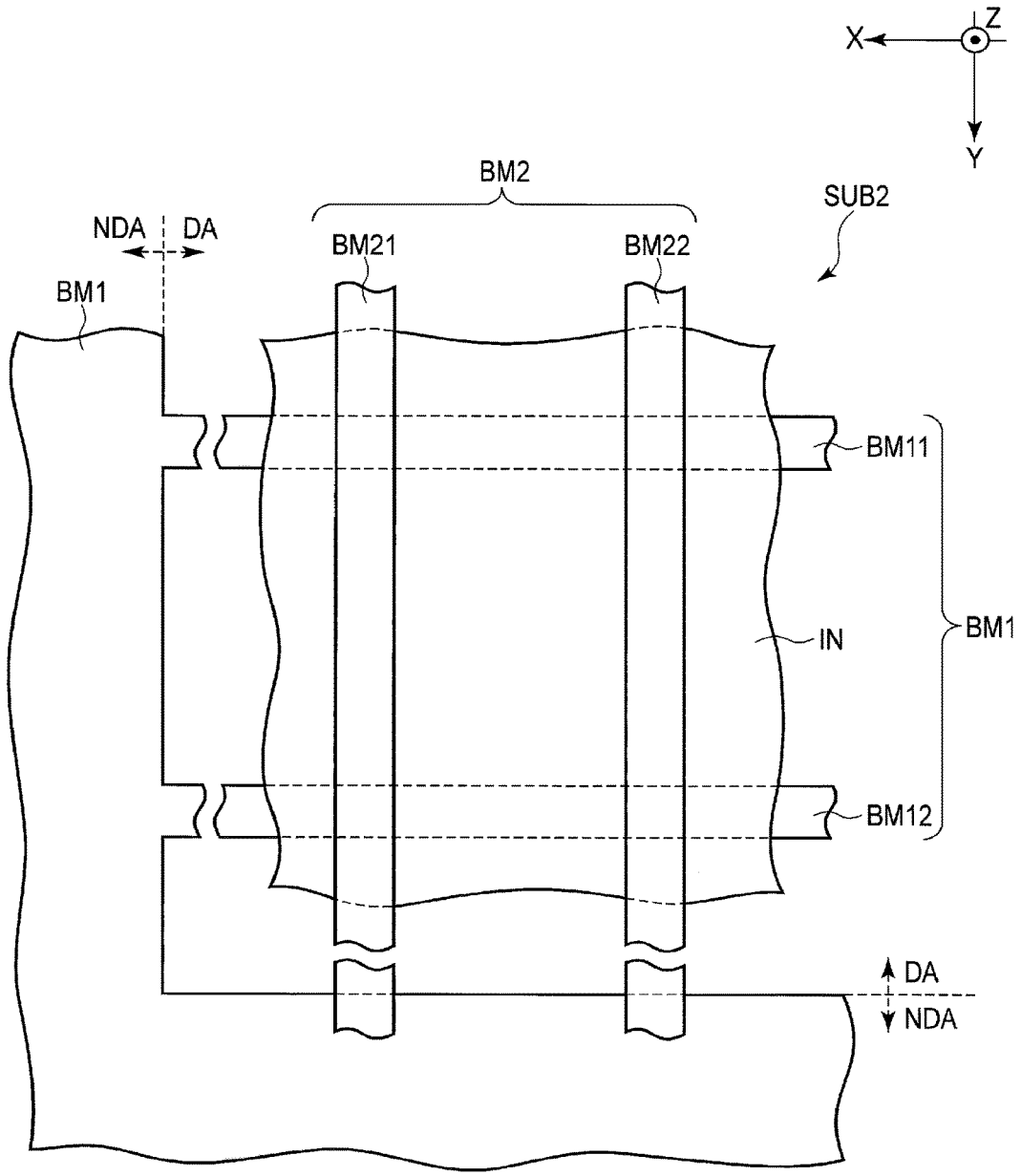
FIG. 4 is a plan view showing a part of the second substrate SUB2 in a display area DA and a non-display area NDA.

FIG. 4 is a plan view showing a part of the structure of the second substrate SUB2 in the display area DA and the non-display area NDA.

The first light shield BM1 extends in the non-display area NDA. As shown in FIG. 1, the non-display area NDA is a frame-like area surrounding the display area DA. Therefore, in the non-display area NDA, the first light shield BM1 is formed in a frame-like shape surrounding the display area DA.

In this embodiment, the first light shield BM1 and the second light shield BM2 are formed through different manufacturing processes, and thus, the materials used may be differed to conform to the main purposes of each shield. For example, if the optical density should be considered, the first light shield BM1 and the second light shield BM2 may be formed of the materials having different optical densities.

For example, in the structural example of FIG. 3, the first light shield BM1 is made relatively wide to be opposed to not only the gate lines but also switching elements while the second light shield BM2 is made thin. In such a structure, the second light shield BM2 can be formed of a material which facilitates processes (for example, a material which is not easily affected by light diffraction during the exposure process and to which micro patterns of the mask can be accurately transferred) added thereto. A resin material of low optical density is suitable for micromachining since the light irradiated in the exposure process can reach the inner part of the resin material. Therefore, the second light shield BM2 can be formed of a resin material of relatively low optical density (for example, an acrylic resin material).

In the structural example of FIG. 4, the first light shield BM1 is in the display area DA and also extends in the non-display area NDA. As described later, a pair of polarization plates is disposed in the display area DA with a crossed-Nicol relationship kept therebetween. Thus, light leakage from the illumination device can be suppressed in the display area DA. However, such a pair of polarization plates does not necessarily extend in the entirety of the non-display area NDA. Therefore, to suppress light leakage from the illumination device in the non-display area NDA, the first light shield BM1 in the non-display area NDA is required to possess a high light shielding performance. That is, the first light shield BM1 can be formed of a resin material of relatively high optical density (for example, polyimide resin material).

Figure 5:
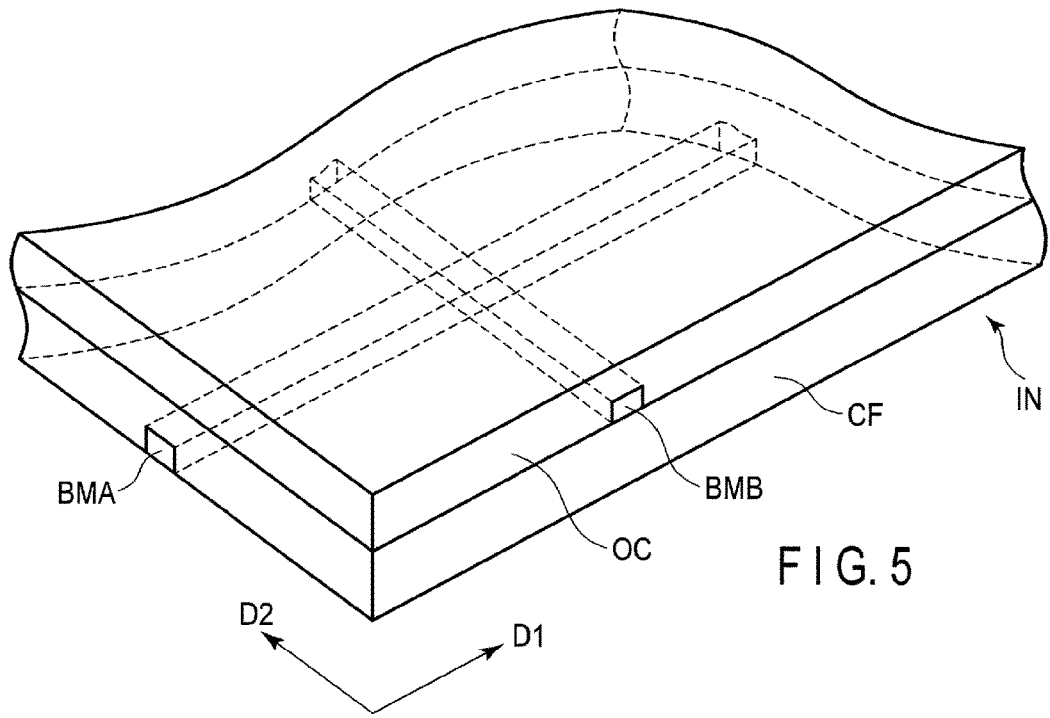
Figure 6:
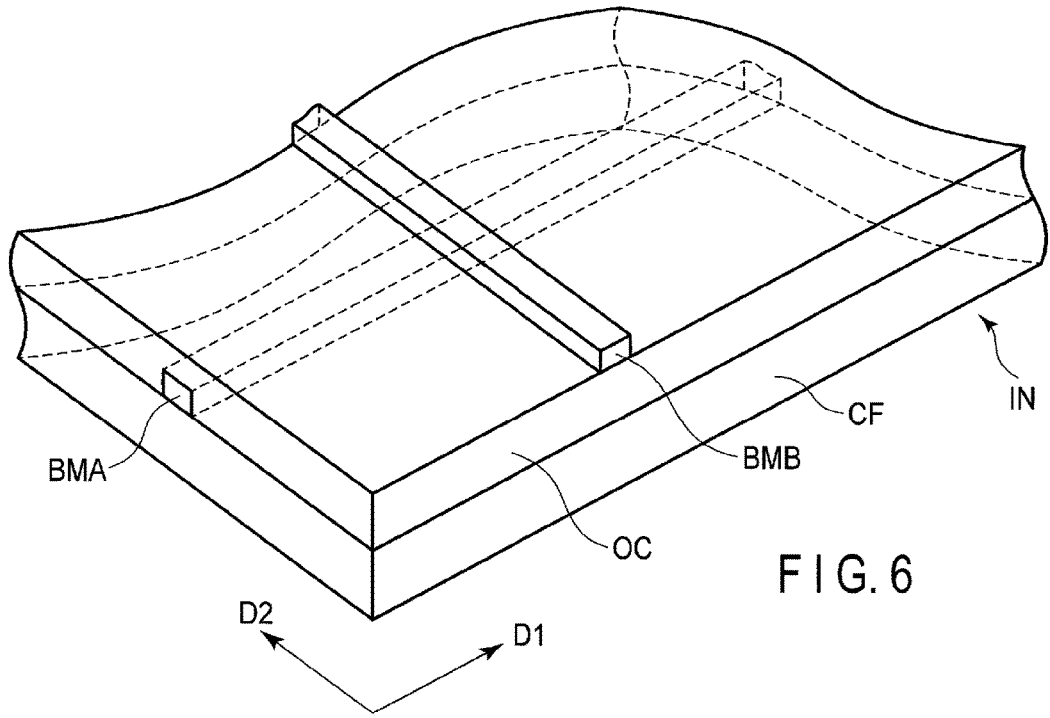
Figure 7:
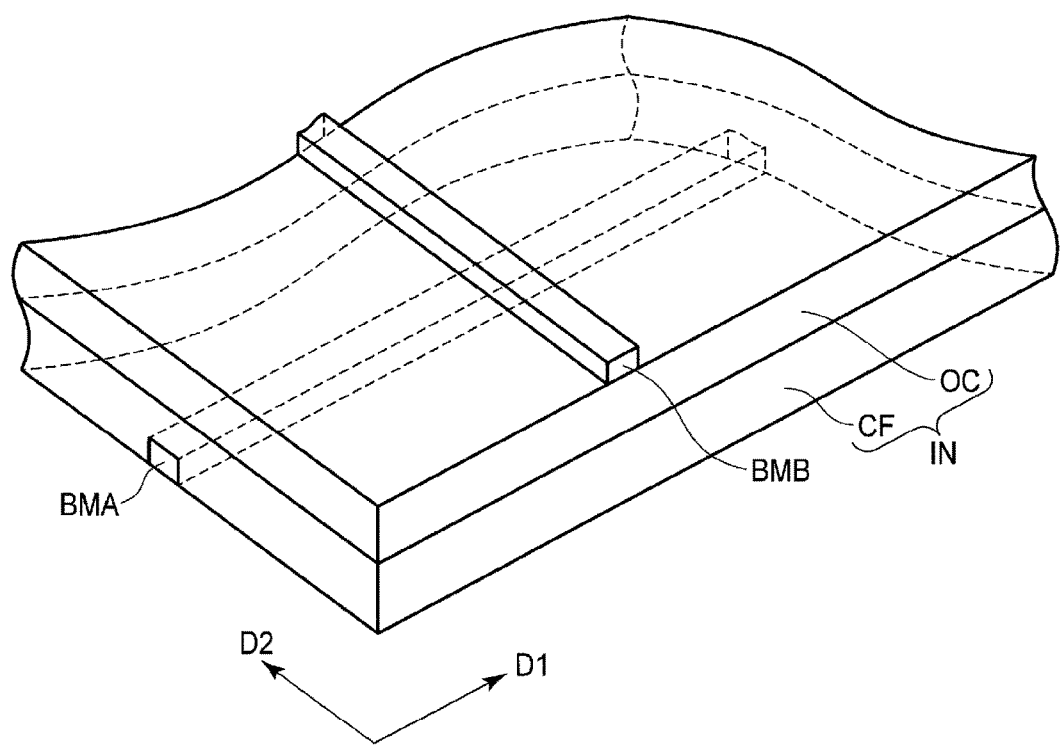

FIGS. 5 to 7 are perspective views each schematically showing a layered structure of a light shield BMA, light shield BMB, and intermediate layer IN. In FIGS. 5 to 7, light shield BMA extends in a direction D1 and light shield BMB extends in a direction D2. Directions D1 and D2 cross each other. For example, if direction D1 corresponds to the first direction X and direction D2 corresponds to the second direction Y, light shield BMA corresponds to the first light shield BM1 and light shield BMB corresponds to the second light shield BM2. Or, if direction D2 corresponds to the first direction X and direction D1 corresponds to the second direction Y, light shield BMA corresponds to the second light shield BM2 and light shield BMB corresponds to the first light shield BM1.

In the example of FIG. 5, a color filter layer CF corresponds to the intermediate layer IN. The color filter layer CF covers light shield BMA. Light shield BMB is formed on the color filter layer CF. An overcoat layer OC covers light shield BMB and is formed on the color filter layer CF.

In the example of FIG. 6, an overcoat layer OC corresponds to the intermediate layer IN. Light shield BMA is formed on the color filter layer CF. The overcoat layer OC covers light shield BMA and is formed on the color filter layer CF. Light shield BMB is formed on the overcoat layer OC.

In the example of FIG. 7, a color filter layer CF and an overcoat layer OC correspond to the intermediate layer IN. The color filter layer CF covers light shield BMA. The overcoat layer OC is formed on the color filter layer CF. Light shield BMB is formed on the overcoat layer OC.

FIG. 8 is a plan view showing the second substrate SUB2 of the embodiment and shows an example of a layout of a color filter layer CF which corresponds to the above intermediate layer, first light shield BM1, and second light shield BM2. The example of FIG. 8 indicates a liquid crystal display device to which the structural example of FIGS. 2 to 4 is applied in a more specific manner.

Color filters CF1, CF2, and CF3 are arranged in the first direction X in said order. Color filters CF1 to CF3 substantially extend in the second direction Y and are formed in bands. Color filter CF1 is a green color filter (G). Color filter CF2 is a blue color filter (B). Color filter CF3 is a red color filter (R). Note that the color filters CF may include a color filter of different color.

In the display area DA, the first light shield BM1 extends in the first direction X in the display area DA, has a first width W1 in the second direction Y, and crosses color filters CF1 to CF3. The first light shield BM1 extends in the non-display area NDA. The second light shield BM2 substantially extends in the second direction Y, has a second width W2 in the first direction X, and crosses the first light shield BM1 through the color filter layer CF. Each side edge of color filters CF1 to CF3 overlaps the second light shield BM2. Boundary L1 between color filters CF1 and CF2, and boundary L2 between color filters CF2 and CF3, are opposed to the second light shield BM2 in the figure. The first width W1 of the first light shield BM1 is, for example, greater than the second width W2 of the second light shield BM2. Furthermore, the first light shield BM1 and the second light shield BM2 are formed of different materials, and the optical density of the material used for the first light shield BM1 is greater than that of the second light shield BM2.

Figure 9:
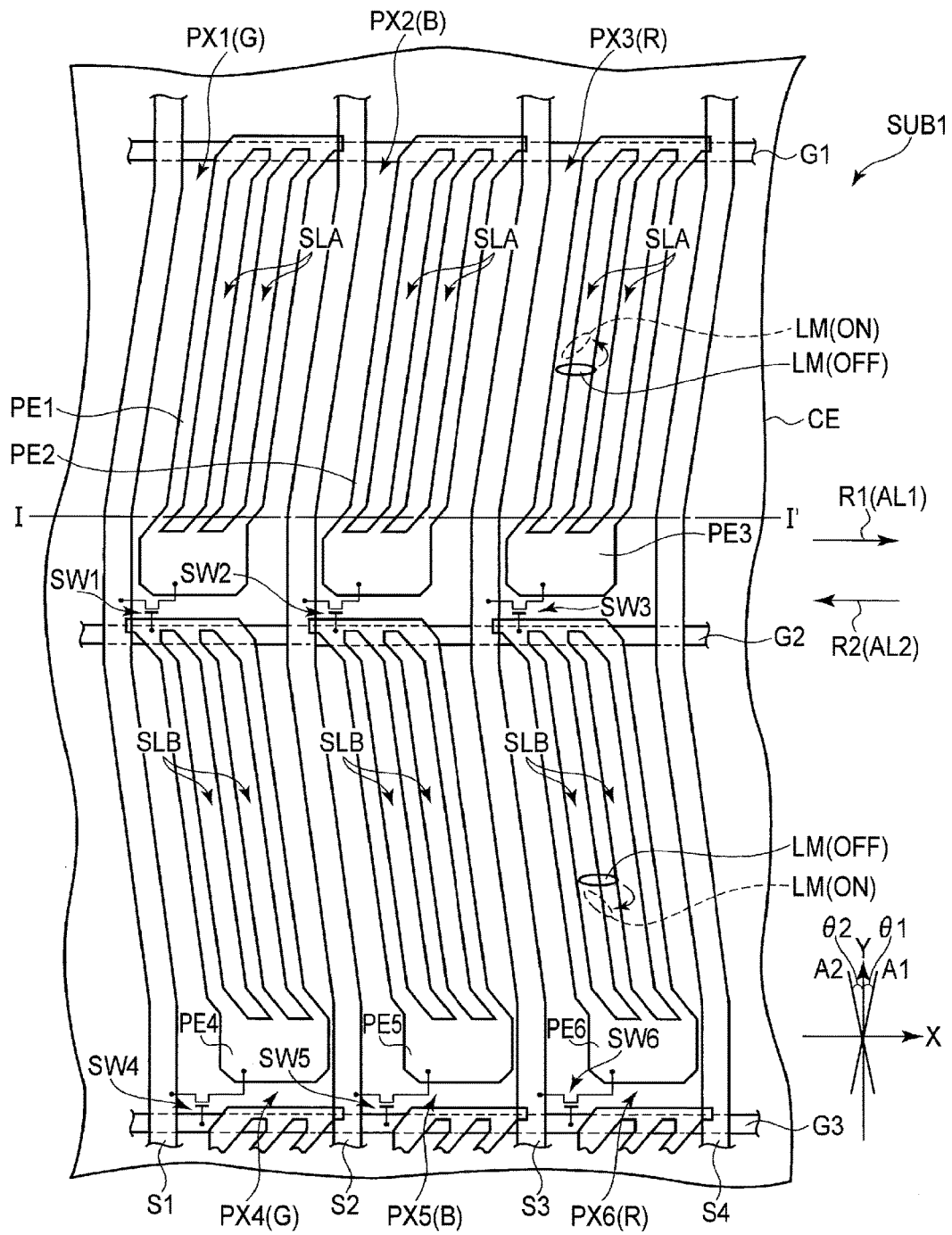
FIG. 9 is a plan view which shows a part of the structure of the first substrate SUB1 which is opposed to the second substrate SUB2 of FIG. 8.

FIG. 9 is a plan view showing a part of the structure of the first substrate SUB1 which is opposed to the second substrate SUB2 of FIG. 8. Note that the structure of the first substrate SUB1 adopted here is an FFS mode which is a transverse field display mode and only main parts which are necessary for the explanation are depicted in the figure.

The first substrate SUB1 includes, for example, gate lines G1 to G3, source lines S1 to S4, switching elements SW1 to SW6, common electrode CE, pixel electrodes PE1 to PE6, and first alignment film AL1.

Gate lines G1 to G3 extend in the first direction X. Source lines S1 to S4 substantially extend in the second direction Y and cross gate lines G1 to G3. The gate lines and source lines define pixels PX1 to PX6.

Pixels PX1 to PX3 arranged in the first direction X are of different colors, and pixels PX4 to PX6 arranged in the first direction X are of different colors. Pixels PX1 and PX4 arranged side by side in the second direction Y are of the same color, and in this example, they are green (G). Pixels PX2 and PX5 arranged side by side in the second direction Y are of the same color, and in this example, they are blue (B). Pixels PX3 and PX6 arranged side by side in the second direction Y are of the same color, and in this example, they are red (R).

Pixel PX1 is defined by gate lines G1 and G2 and source lines S1 and S2, pixel PX2 is defined by gate lines G1 and G2 and source lines S2 and S3, and pixel PX3 is defined by gate lines G1 and G2 and source lines S3 and S4. Pixels PX1 to PX3 extend in a first direction of extension A1 which crosses the second direction Y at an acute angle clockwise. Source lines S1 to S4 defining pixels PX1 to PX3 extend in the first direction of extension A1.

Pixel PX4 is defined by gate lines G2 and G3 and source lines S1 and S2, pixel PX5 is defined by gate lines G2 and G3 and source lines S2 and S3, and pixel PX6 is defined by gate lines G2 and G3 and source lines S3 and S4. Pixels PX4 to PX6 extend in a second direction of extension A2 which crosses the second direction Y at an acute angle counter-clockwise. Source lines S1 to S4 defining pixels PX4 to PX6 extend in the second direction of extension A2. Note that, an angle θ1 between the second direction Y and the first direction of extension A1, and an angle θ2 between the second direction Y and the second direction of extension A2, are approximately the same; that is, angles θ1 and θ2 are 5 to 15°, for example.

The common electrode CE extends in substantially the entirety of the first substrate SUB1 and is common with pixels PX1 to PX6. That is, the common electrode CE extends in the second direction Y over gate lines G1 to G3, extends in the first direction X over source lines S1 to S4, and is disposed to correspond to pixels PX1 to PX6. Note that, although this is not detailed, the common electrode CE has openings used for electrical connection of pixel electrodes and switching elements.

In pixel PX1, switching element SW1 and pixel electrode PE1 are disposed. Switching element SW1 is electrically connected to gate line G2 and source line S1. Pixel electrode PE1 is disposed between source lines S1 and S2, and is connected to switching element SW1.

In pixel PX2, switching element SW2 and pixel electrode PE2 are disposed. Switching element SW2 is electrically connected to gate line G2 and source line S2. Pixel electrode PE2 is disposed between source lines S2 and S3, and is connected to switching element SW2.

In pixel PX3, switching element SW3 and pixel electrode PE3 are disposed. Switching element SW3 is electrically connected to gate line G2 and source line S3. Pixel electrode PE3 is disposed between source lines S3 and S4, and is connected to switching element SW3.

Similarly, in pixel PX4, switching element SW4 electrically connected to gate line G3 and source line S1 and pixel electrode PE4 connected to switching element SW4 are disposed. In pixel PX5, switching element SW5 electrically connected to gate line G3 and source line S2 and pixel electrode PE5 connected to switching element SW5 are disposed. In pixel PX6, switching element SW6 electrically connected to gate line G3 and source line S3 and pixel electrode PE6 connected to switching element SW6 are disposed.

Switching elements SW1 to SW6 are, for example, a thin-film transistor (TFT). Gate lines G1 to G3 and switching elements SW1 to SW6 are opposed to the first light shield BM1 of FIG. 8. Furthermore, source lines S1 to S4 are opposed to the second light shield BM2 of FIG. 8.

Pixel electrodes PE1 to PE6 are disposed above the common electrode CE. Each of pixel electrodes PE1 to PE3 is formed in an island shape to conform to the shape of corresponding pixel extending in the first direction of extension A1. Furthermore, each of pixel electrodes PE1 to PE3 has a slit SLA extending in the first direction of extension A1. Each of pixel electrodes PE4 to PE6 is formed in an island shape to conform to the shape of corresponding pixel extending in the second direction A2. Furthermore, each of pixel electrodes PE4 to PE6 has a slit SLB extending in the second direction of extension A2. Slits SLA and SLB face the common electrode CE.

An alignment treatment direction R1 of the first alignment film AL1 is, for example, parallel to the first direction X. Furthermore, an alignment treatment direction R2 of the second alignment film AL2 of the second substrate SUB2 of FIG. 8 is, for example, parallel to the first direction X but is opposite to alignment treatment direction R1. The alignment treatment with respect to the first alignment film AL1 and the second alignment film AL2 is, for example, a rubbing process or a photo-alignment process.

Figure 10:
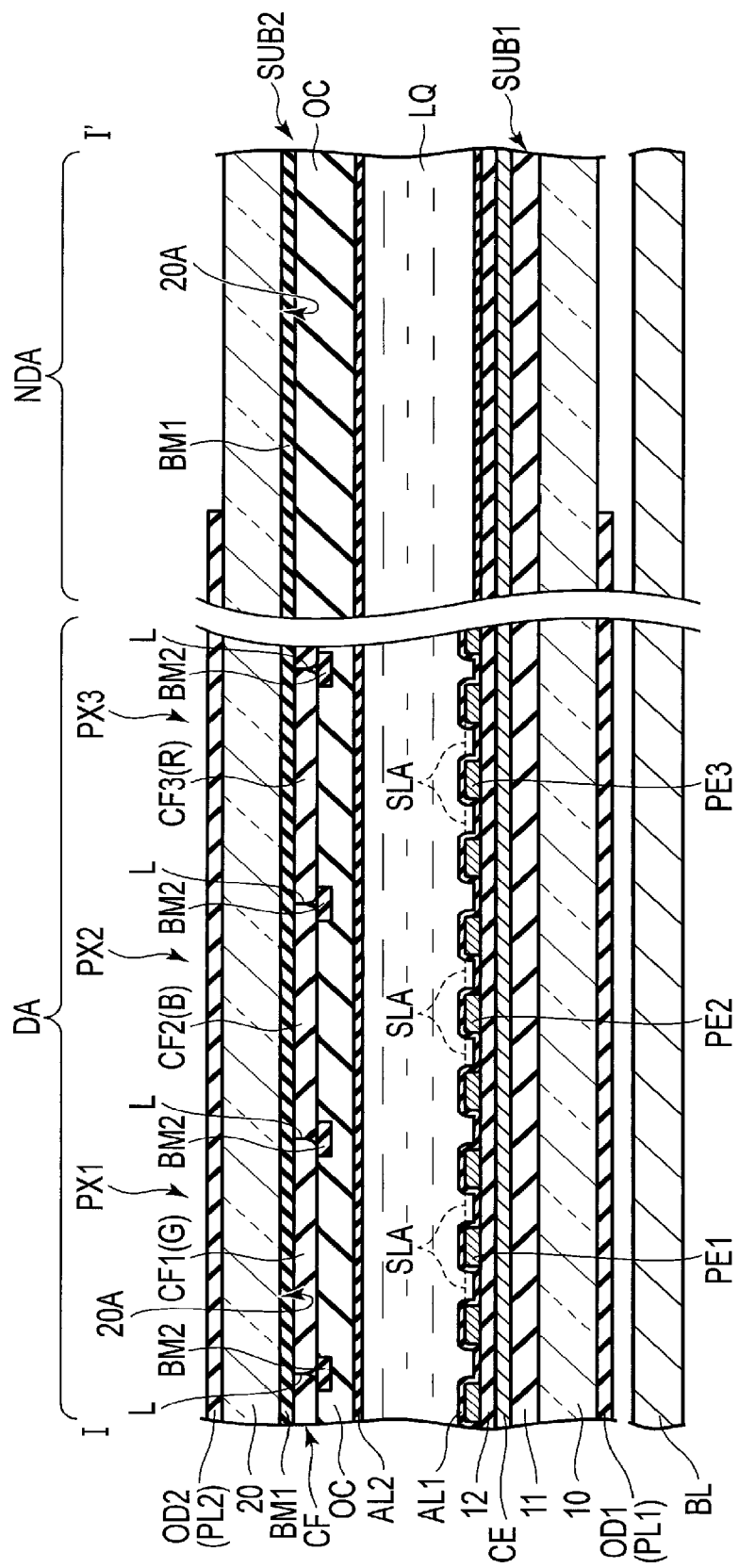
FIG. 10 is a cross-sectional view of a display panel PNL, taken along line I-I' of FIG. 9.

FIG. 10 is a cross-sectional view of the display panel PNL, taken along line I-I' of FIG. 9. Note that the cross-sectional view of FIG. 10 shows the display panel PNL in the display area DA and also in the non-display area NDA. The first substrate SUB1 is formed of a transparent first insulating substrate 10 such as a glass substrate or a resin substrate. The first substrate SUB1 includes, on the first insulating substrate 10 as being opposed to the second substrate SUB2, a switching element (which is not shown), common electrode CE, pixel electrodes PE1 to PE3, first insulating film 11, second insulating film 12, and first alignment film AL1.

The common electrode CE is formed on the first insulating film 11. The common electrode CE is formed of a transparent conductive material such as indium tin oxide (ITO) or indium zinc oxide (IZO). Note that elements which are not shown here such as gate lines, source lines, and switching elements are formed between the first insulating substrate 10 and the first insulating film 11.

Pixel electrodes PE1 to PE3 are formed on the second insulating film 12 to face the common electrode CE. Each of pixel electrodes PE1 to PE3 includes a slit SLA. Pixel electrodes PE1 to PE3 are formed of a transparent conductive material such as ITO and IZO. Pixel electrodes PE1 to PE3 are covered with the first alignment film AL1. The first alignment film AL1 covers the second insulating film 12. The first alignment film AL1 is formed of, for example, a horizontal alignment material and is disposed on the first substrate SUB1 to contact the liquid crystal layer LQ.

On the other hand, the second substrate SUB2 is formed of a transparent second insulating substrate 20 such as a glass substrate or a resin substrate. The second substrate SUB2 includes, on the second insulating substrate 20 as being opposed to the first substrate SUB1, a first light shield BM1, color filters CF1 to CF3, second light shield BM2, overcoat layer OC, and second alignment film AL2.

The first light shield BM1 is formed on an inner surface 20A of the second insulating substrate 20 to be opposed to the first substrate SUB1. The first light shield BM1 is further formed on the inner surface 20A of the non-display area NDA. Each of color filters CF1 to CF3 covers the first light shield BM1. Note that, if there is not a first light shield BM1 within the display area DA, color filters Cf1 to CF3 are formed on the inner surface 20A. Color filter CF1 is formed of a green resin material. Color filter CF2 is formed of a blue resin material. Color filter CF3 is formed of a red resin material.

The second light shield BM2 is formed on the color filter layer CF to be opposed to the first substrate SUB1. The second light shield BM2 is formed to be opposed to boundaries L of the color filters. Note that, in the example depicted, the second light shield BM2 is disposed to bridge over color filters of different colors. That is, edges of adjacent color filters form an underlying for the second light shield BM2. Thus, edges of adjacent color filters should be formed as even as possible to prevent excessively overlapping with each other. In the example depicted, the second light shield BM2 is formed to be closer to the first substrate SUB1 than is the first light shield BM1. Note that, although the color filter layer CF does not extend in the non-display area NDA in the example depicted, it may partly be layered on the first light shield BM1 in the non-display area NDA.

The overcoat layer OC covers the second light shield BM2 and color filters CF1 to CF3. In the non-display area NDA, the overcoat layer OC covers the first light shield BM1. The overcoat layer OC is formed of a transparent resin material. The overcoat layer OC is covered with the second alignment film AL2. The second alignment film AL2 is formed of, for example, a horizontal alignment material and is disposed on the second substrate SUB2 to contact the liquid crystal layer LQ.

In the above-explained relationship, the first substrate SUB1 and the second substrate SUB2 are disposed such that the first alignment film AL1 and the second alignment film AL2 face each other. The first substrate SUB1 and the second substrate SUB2 are adhered by a sealant with a cell gap formed therebetween. The liquid crystal layer LQ is composed of liquid crystal components including liquid crystal molecules LM sealed within the cell gap between the first alignment film AL1 of the first substrate SUB1 and the second alignment film AL2 of the second substrate SUB2. In this example, the liquid crystal layer LQ is of negative type; however, it may be of positive type.

In such a display panel PNL, an illumination device BL is disposed in the rear side. Various types of illumination devices can be adopted as the illumination device BL. Explanation of its detailed structure will be omitted.

On the outer surface of the first insulating substrate 10, a first optical element OD1 including a first polarization plate PL1 is disposed. On the outer surface of the second insulating substrate 20, a second optical element OD2 including a second polarization plate PL2 is disposed. For example, a first absorption axis of the first polarization plate PL1 and a second absorption axis of the second polarization plate PL2 are orthogonal to each other in the X-Y plane. Furthermore, one of the first absorption axis and the second absorption axis is parallel to the direction of the initial alignment of liquid crystal molecules LM.

Hereinafter, the operation of the above liquid crystal display device will be explained.

When a voltage is not applied to the liquid crystal layer LQ (off state), a field is not produced between pixel electrodes PE and the common electrode CE. Thus, liquid crystal molecules LM in the liquid crystal layer LQ is, as indicated by a solid line in FIG. 9, are initially aligned in the first direction X in the X-Y plane by the alignment restriction force of the first alignment film AL1 and the second alignment film AL2. That is, the direction of the initial alignment of liquid crystal molecules LM is parallel to the first direction X.

In the off state, light from the illumination device BL partly passes the first polarization plate PL1 and enters the display panel PNL. The light incident on the display panel PNL is linearly polarized light which is orthogonal to the first absorption axis of the first polarization plate PL1. The polarization state of the linearly polarized light does not substantially change when passing the display panel PNL in the off state. Therefore, basically the entirety of the linearly polarized light passing through the display panel PNL is absorbed by the second polarization plate PL2 (black display). Although the first optical element OD1 and the second optical element OD2 do not cover the entirety of the non-display area NDA, the light from the illumination device BL is blocked by the first light shield BM1 having a relatively high optical density.

On the other hand, when a voltage is applied to the liquid crystal layer LQ (on state), a fringe field is produced between pixel electrodes PE and the common electrode CE. Thus, as indicated by dotted line in FIG. 9, liquid crystal molecules LM are aligned in a direction different from their initial alignment in the X-Y plane. With the liquid crystal material of negative type, liquid crystal molecules LM of pixel PX3 rotate counterclockwise to be aligned in the direction substantially parallel to the fringe field in the X-Y plane, and liquid crystal molecules LM of pixel PX6 rotate clockwise to be aligned in the direction substantially parallel to the fringe field in the X-Y plane. At that time, the direction of the alignment of the liquid crystal molecules LM depends on the size of the field.

In the on state, the linearly polarized light which is orthogonal to the first absorption axis of the first polarization plate PL1 enters the display panel PNL and the polarization state thereof changes when passing through the liquid crystal layer LQ depending on the alignment state of the liquid crystal molecules LM. Therefore, in the on state, the light passing through the liquid crystal layer LQ at least partly passes the second polarization plate PL2 (white display).

The normally black mode is achieved through the above structure.

FIG. 11 is a cross-sectional view schematically showing the display panel PNL of FIG. 10 in which a misalignment occurs between the first substrate SUB1 and the second substrate SUB2. In this example, the second substrate SUB2 is adhered to the first substrate SUB1 with misalignment parallel to the first direction X by a gap dl. Note that only the structures necessary for explanation are shown in the figure.

Here, the first substrate SUB1 includes a metal layer M on the common electrode CE. The metal layer M is opposed to the second light shield BM2 and extends substantially parallel to the second light shield BM2. The metal layer M is formed of a light shielding metal material and functions as a third light shield.

To achieve pixels PX with high definition, the pitch of the pixels PX must be decreased. The decrease in the pitch causes a decrease in aperture ratio, and to suppress the decrease in aperture ratio, the first light shield BM1 and the second light shield BM2 defining the pixels PX should be made thinner.

However, when the second light shield BM2 positioned between pixels of different colors is made thinner, misalignment occurs between the first substrate SUB1 and the second substrate SUB2, and consequently, the display quality will be deteriorated. According to a simulation in which a display device is prepared with a 10 µm pitch of pixels PX, 5 µm width of the second light shield BM2, and 2.5 µm misalignment between the substrates, almost the entirety of the light was blocked by the second light shield BM2 when the device was viewed from an angle tilted by 40° with respect to the normal of the screen, and thus, a significant decrease in transmissivity was confirmed. Moreover, when the display device was viewed from an angle greater than 40°, light passing through a color filter of a pixel mixes with light passing through a color filter of an adjacent pixel, and thus, a color mixture phenomenon was confirmed. To prevent such a color mixture phenomenon, methods such as increasing the width of the second light shield BM2 and decreasing the percentage modulation in boundaries of pixels of the liquid crystal layer were considered; however, such methods cause a decrease in transmissivity of per pixel and they are not appropriate for the high definition display technique in which the pixel size is reduced.

In consideration of the above, the second light shield BM2 is formed closer to the first substrate SUB1 than is the first light shield BM1 in the present embodiment. Light paths a to d correspond to the path of the light incident on the first substrate SUB1 in pixel PX1. Along light paths a and b, light passes the second substrate SUB2 through color filter CF1 in pixel PX1. Light traveling along light path c, which is closer to pixel PX2 than are light paths a and b, is blocked by the second light shield BM2 of the second substrate SUB2 and is prevented from exiting from color filter CF2 of pixel PX2. Light traveling along light path d, which is closer to pixel PX2 than is light path c, is blocked by the metal layer M of the first substrate SUB1 in pixel PX1 and is prevented from exiting from pixel PX2.

As can be understood from the above, even if pixels PX1 and PX2 adjacent to each other over a second light shield BM2 are in the on and off states, respectively, the light entering in pixel PX1 is prevented from exiting from pixel PX2 by the second light shield BM2 as indicated by light paths c and d. Therefore, even if a misalignment occurs between the first substrate SUB1 and the second substrate SUB2 and the display panel PNL is viewed from a tilted angle, the deterioration of display quality by the color mixture can be suppressed. Furthermore, since increasing the width of the light shield BM for prevention of the color mixture is unnecessary, reduction of display area per pixel can be suppressed and a decrease in transmissivity can be suppressed.

Figure 12:
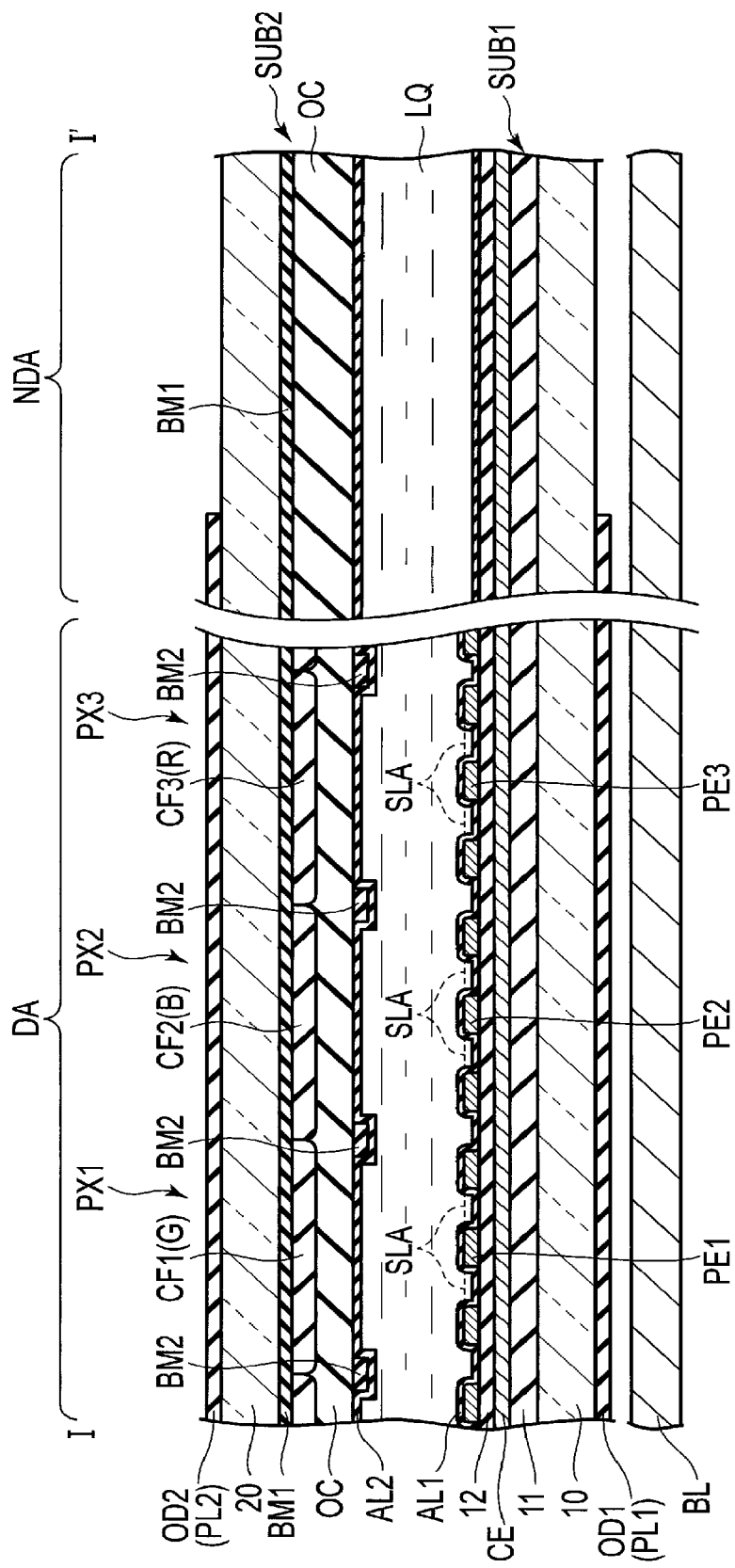
FIG. 12 is a cross-sectional view of a display panel PNL of another example, taken along line I-I' of FIG. 9.

FIG. 12 is a cross-sectional view of a display panel PNL of another example, taken along line I-I' of FIG. 9. As compared with the structure of FIG. 10, the position of the second light shield BM2 is different in the display panel PNL of FIG. 12.

The overcoat layer OC covers the color filter layer CF. The second light shield BM2 is formed on the overcoat layer OC. The second alignment film AL2 covers the second light shield BM2 and covers the overcoat layer OC. In the example of FIG. 12, the second light shield BM2 is formed to be closer to the first substrate SUB1 than is the first light shield BM1. Furthermore, in this example, the color filter layer CF and the overcoat layer OC correspond to the intermediate layer IN.

Figure 13:
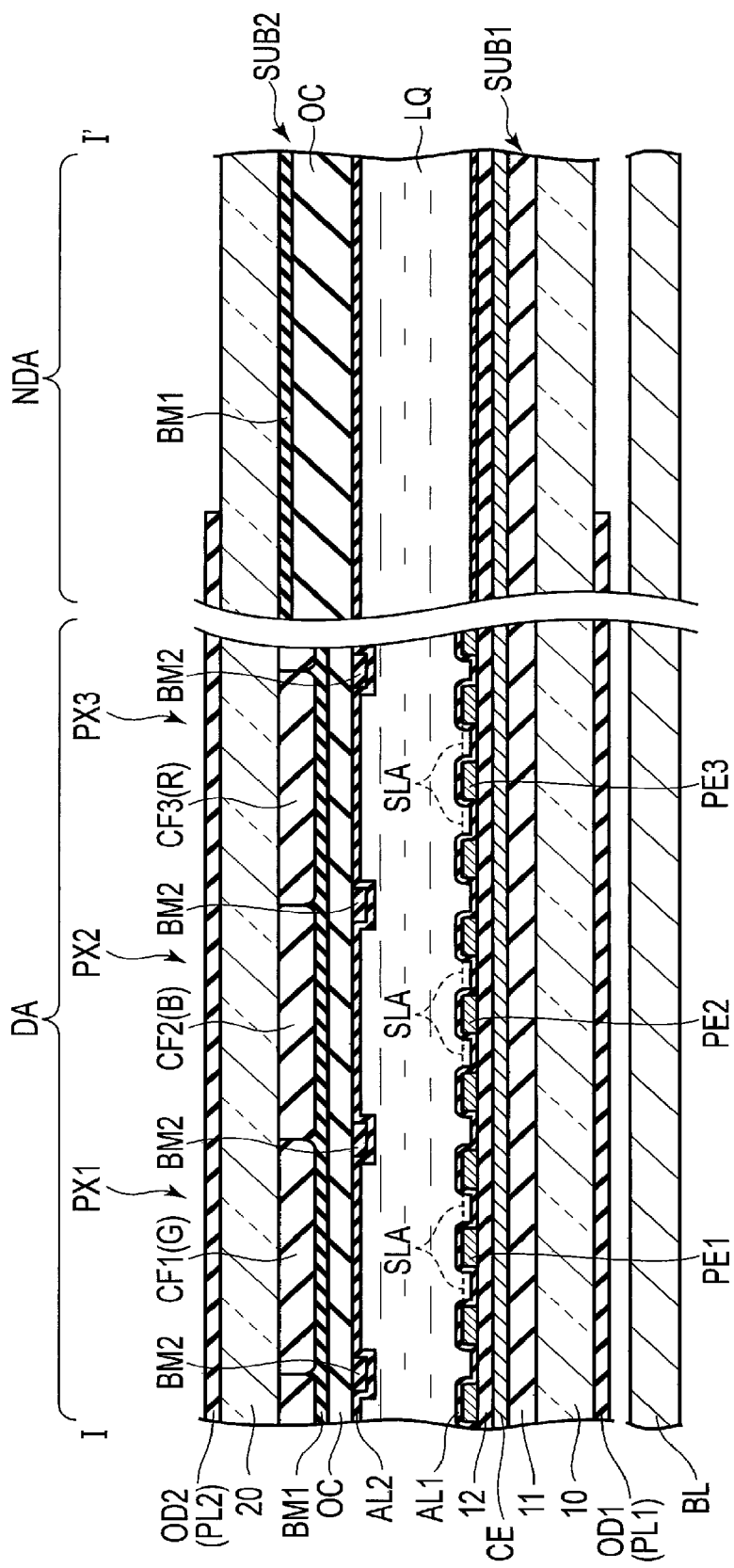
FIG. 13 is a cross-sectional view of a display panel PNL of still another example, taken along line I-I' of FIG. 9.

FIG. 13 is a cross-sectional view of a display panel PNL of still another example, taken along line I-I' of FIG. 9. As compared with the structure of FIG. 12, the position of the first light shield BM1 is different in the display panel PNL of FIG. 13.

The first light shield BM1 is formed on the color filter layer CF. The overcoat layer OC covers the first light shield BM1. In the example of FIG. 13, the second light shield BM2 is formed to be closer to the first substrate SUB1 than is the first light shield BM1. Furthermore, in this example, the overcoat layer OC corresponds to the intermediate layer IN.

Figure 14:
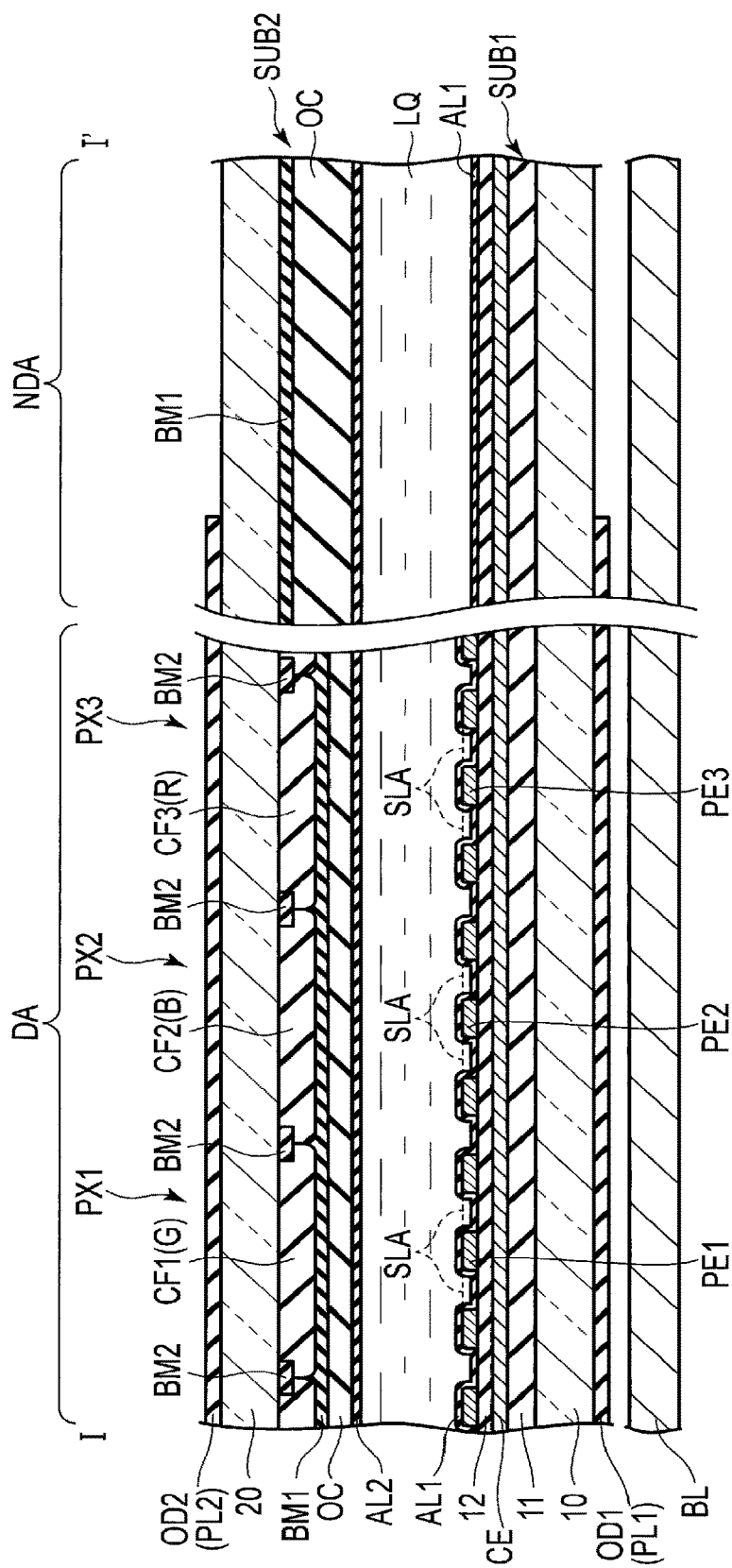
FIG. 14 is a cross-sectional view of a display panel PNL of still another example, taken along line I-I' of FIG. 9.

FIG. 14 is a cross-sectional view of a display panel PNL of still another example, taken along line I-I' of FIG. 9. As compared with the structure of FIG. 13, the position of the second light shield BM2 is different in the display panel PNL of FIG. 14.

The second light shield BM2 is formed on the second insulating substrate 20. The color filter layer CF covers the second light shield BM2. In the example of FIG. 14, the first light shield BM1 is formed to be closer to the first substrate SUB1 than is the second light shield BM2. Furthermore, in this example, the color filter layer CF corresponds to the intermediate layer IN.

Figure 15:
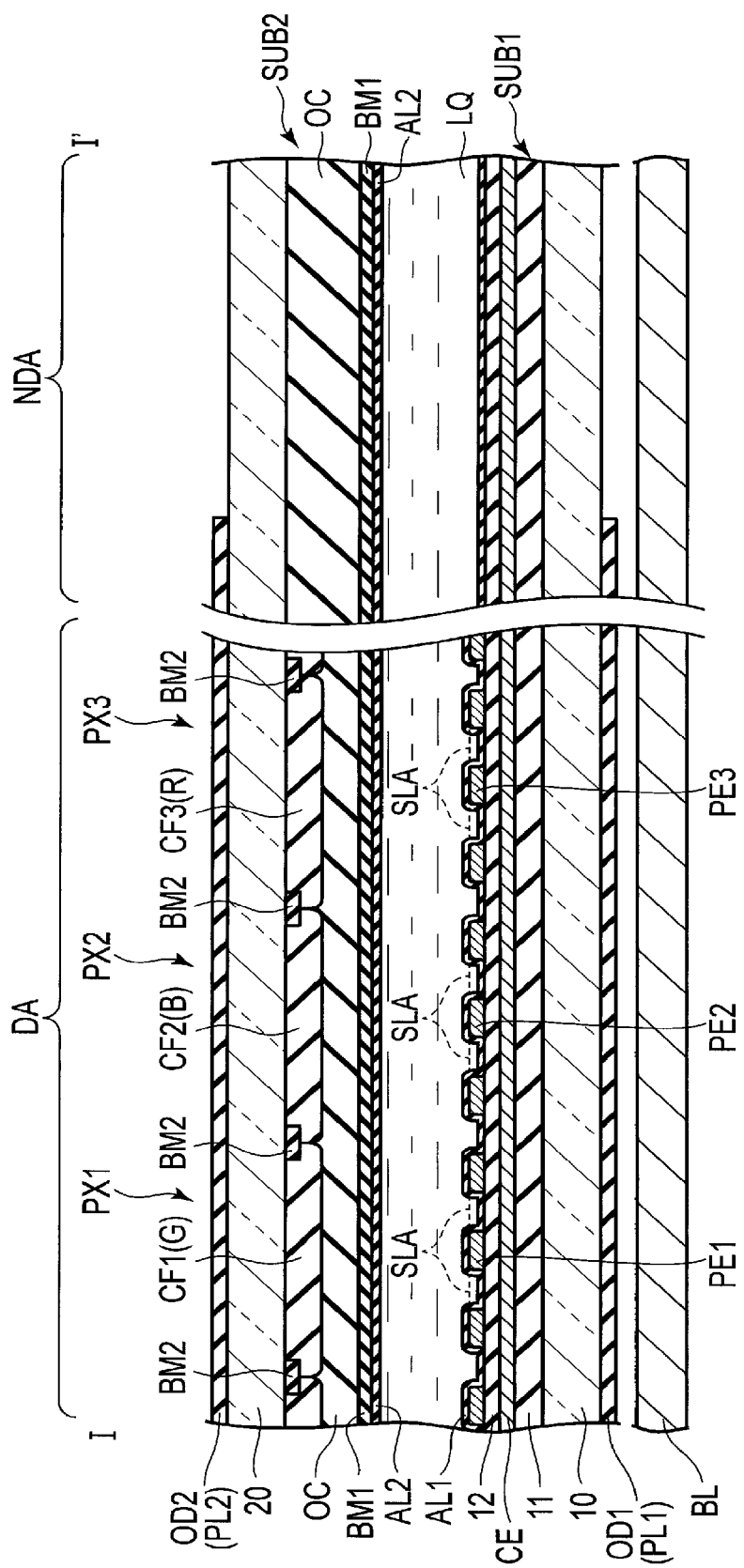
FIG. 15 is a cross-sectional view of a display panel PNL of still another example, taken along line I-I' of FIG. 9.

FIG. 15 is a cross-sectional view of a display panel PNL of still another example, taken along line I-I' of FIG. 9. As compared with the structure of FIG. 14, the position of the first light shield BM1 is different in the display panel PNL of FIG. 15.

The first light shield BM1 is formed on the overcoat layer OC. Furthermore, the first light shield BM1 extends in the overcoat layer OC in the non-display area NDA. In the example of FIG. 15, the first light shield BM1 is formed to be closer to the first substrate SUB1 than is the second light shield BM2. Furthermore, in this example, the color filter layer CF and the overcoat layer OC correspond to the intermediate layer IN.

Figure 16:
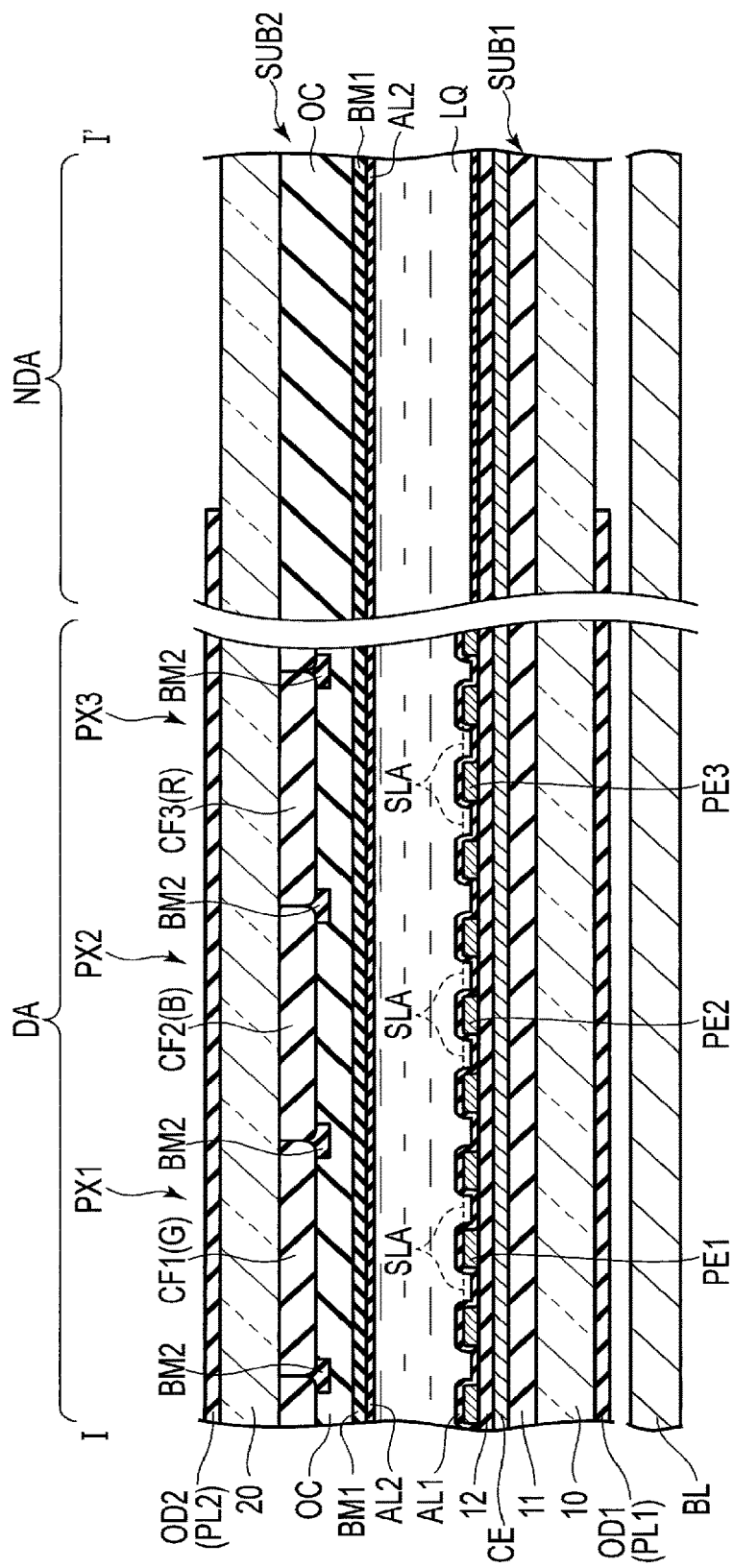
FIG. 16 is a cross-sectional view of a display panel PNL of still another example, taken along line I-I' of FIG. 9.

FIG. 16 is a cross-sectional view of a display panel PNL of still another example, taken along line I-I' of FIG. 9. As compared with the structure of FIG. 15, the position of the second light shield BM2 is different in the display panel PNL of FIG. 16.

The second light shield BM2 is formed on the color filter layer CF. In the example of FIG. 16, the first light shield BM1 is formed closer to the first substrate SUB1 than is the second light shield BM2. Furthermore, in this example, the overcoat layer OC corresponds to the intermediate layer IN.

In such examples, the same advantages as in the above embodiment can be achieved.

As can be understood from the above, the present application presents a liquid crystal display device which can suppress a decrease in aperture ratio.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A color filter substrate of a display device, comprising:
an insulating substrate;
first light shields disposed directly on the insulating substrate;
a color filter layer in contact with the first light shields;
a resin layer in contact with the color filter layer; and
second light shields disposed directly on the resin layer, wherein
the first light shields extend in a first direction and are arranged apart from each other in a second direction which crosses the first direction in a display area, and the second light shields extend in the second direction and are arranged apart from each other in the first direction in the display area,
the color filter layer includes a first color filter extending in the second direction, and a second color filter adjacent to the first color filter and extending in the second direction,
the second light shields are arranged on a boundary between the first color filter and the second color filter,
the first light shields cross the second light shields with the color filter layer and the resin layer interposed therebetween in the display area,
the first light shields cover all of a peripheral area which surrounds the display area, and
the second light shields are not disposed in the peripheral area.

2. The color filter substrate of claim 1, wherein the first light shields have a first width, the second light shields have a second width, and the first width is greater than the second width.

3. The color filter substrate of claim 1, wherein the first light shields and the second light shields have different optical densities.

4. The color filter substrate of claim 1, further comprising a first pixel including the first color filter and a second pixel including the second color filter, wherein light incident on the first pixel at a position close to the second pixel is blocked by the second light shields.

5. The color filter substrate of claim 1, further comprising an alignment layer which is in contact with the second light shields and the resin layer.

6. A display device comprising:
a first insulating substrate,
gate lines extending in a first direction in a display area,
source lines extending in a second direction which crosses the first direction in the display area,
a second insulating substrate opposed to the first insulating substrate,
first light shields disposed directly on a surface of the second insulating substrate, which is opposed to the first insulating substrate, and the first light shields opposed to the gate lines,
a color filter layer in contact with the first light shields,
a resin layer in contact with the color filter layer, and
second light shields disposed directly on the resin layer and opposed to the source lines, wherein
the first light shields extend in the first direction, and the second light shields extend in the second direction,
the color filter layer includes a first color filter extending in the second direction, and a second color filter adjacent to the first color filter and extending in the second direction,
the second light shields are arranged on a boundary between the first color filter and the second color filter, and
the first light shields cross the second light shields with the color filter layer and the resin layer interposed therebetween.

7. The display device of claim 6, wherein the first light shields have a first width, the second light shields have a second width, and the first width is greater than the second width.

8. The display device of claim 6, wherein the first light shields extend in a peripheral area surrounding the display area, and
the second light shields are not disposed in the peripheral area.

9. The display device of claim 6, wherein the first light shields and the second light shields have different optical densities.

10. The display device of claim 6, further comprising third light shields disposed between the second light shields and the source lines.

11. The display device of claim 6, further comprising an alignment film being in contact with the resin layer and the second light shields.

* * * * *